United States Patent Office 3,274,125
Patented Sept. 20, 1966

3,274,125
REGENERABLE ADSORBENT GELS AND THE METHOD OF THEIR PREPARATION
Richard G. Clarke, Hartford, Richard H. Groth, South Windham, and Edward J. Duzak, Hartford, Conn., assignors to United Aircraft Corporation, East Hartford, Conn., a corporation of Delaware
No Drawing. Filed Mar. 24, 1961, Ser. No. 98,003
The portion of the term of the patent subsequent to July 21, 1981, has been disclaimed
10 Claims. (Cl. 252—466)

The present invention relates to cogels and to methods for making cogels.

This application is a continuation-in-part of U.S. Serial No. 41,801, filed July 11, 1960, now U.S.P. 3,141,729.

More particularly the present invention relates to cogels of divalent and trivalent metals, to methods of making such cogels wherein carbon dioxide gas is evolved, and to a process for adsorbing carbon dioxide and water on such cogels and desorbing carbon dioxide and water from such cogels with the expenditure of a minimum of energy.

Methods used for the removal of carbon dioxide from an atmosphere in the past have usually involved washing the carbon dioxide containing atmosphere with caustic solutions to precipitate metallic carbonates. Such caustic solutions are quite easily prepared, are relatively inexpensive, and are efficient in operation. Moreover, the metallic carbonates formed may be consumed as by products or simply discarded as waste.

Where availability of reagents, energy sources and space in which to carry out the treatment of carbon dioxide containing atmospheres are not limited, conventional systems have proved satisfactory.

The problem facing a voyager in space, however, is that of removing the noxious by-products of respiration, such as carbon dioxide, in such a way that a minimum volume of the available working area is occupied for this purpose. With this point in mind, the removal means should be such that it is regenerable with a minimum input of energy and over a great number of cycles.

The best mode of such regeneration would be to utilize the vacuum existing in interplanetary space to remove the carbon dioxide scavenged from the atmosphere within the space vehicle or to use such heat as is generated within the vehicle as may be surplus and excessive by its encounters with the random matter in space or such other heat as may be advantageously dissipated from the spaceship.

It is the primary object of the present invention to provide regenerable means for removal of carbon dioxide and water vapor in the atmosphere of space vehicles. An analogous use for the compositions described herein, in undersea craft can also readily be envisioned, however.

According to the present invention, compositions for removing carbon dioxide and water from an environmental atmosphere have been prepared which are readily regenerated by drawing a vacuum thereon, supplying heat thereto, or by using a combination of vacuum and heat.

According to another embodiment of the present invention, a method for the preparation of regenerable adsorbents for carbon dioxide has been discovered which comprises preparing an aqueous solution of carbonate ions, and adding thereto less than or substantially a stoichiometric amount of the combination of a salt or salts of divalent metals and the salt or salts of trivalent metals, the molar ratio of binary metal or metals to trivalent metal or metals added to the carbonate solution depending upon the molar ratio of divalent to trivalent metal desired in the gel.

According to still a further embodiment of the present invention, the process for purifying atmospheres containing carbon dioxide and water has been discovered which comprises passing said atmospheres into contact with the adsorbents described herein, regenerating the adsorbents by desorbing the adsorbed carbon dioxide and water by applying at least one of the desorbing means, heat and a vacuum, venting the desorbed material into another atmosphere and retintroducing the atmosphere to be cleaned into contact with the regenerated adsorbents.

According to the present invention, regenerable adsorbents for carbon dioxide gas have been produced which comprise ferric oxide gel modified by a bivalent oxide or bivalent oxides. Based on total moles of ferric iron and bivalent metal or metals in the gels, the mole precent of bivalent metal is quite small, generally less than 10 mole percent, and usually less than 5 mole percent, or between about 0.1 and 5 mole percent. Particularly good results are achieved when the mole percent of bivalent metal or metals is between about 0.25 and 2.5 mole percent. Based on total moles of iron and bivalent metals in the gel, the mole percent of ferric metal may range from 90 to 99.9 mole percent, is usually between about 95 and 99.9 mole percent, and is preferably between about 97.5 and 99.75 mole percent.

Typical of the bivalent metals forming part of the gels disclosed herein are zinc, ferrous iron, nickel, copper, cobalt, manganese, magnesium, calcium, barium, cadmium, and mixtures of the foregoing. Especially good results are achieved when the binary metal is taken from the group consisting of cobalt nickel, copper, and manganese, and those are preferred.

Of the bivalent metals, cobalt appears to give the best results. In the class of absorbent materials described herein, accordingly, a gel of the composition $CoO:Fe_2O_3$, in which the molar ratio of cobalt to iron is about 0.25 to 5.0:99.75 to 95.0, has been found to have optimum properties as a regenerable carbon dioxide adsorbent, and is preferred.

The preferred gels described herein have a specific surface for adsorption of pure $CO_2$ at 1 atmosphere pressure and 0° C. of at least 100 m.²/gram, usually at least 120 m.²/gram, or between about 120 m.²/gram and 350 m.²/gram or even higher. Such gels also have the ability to desorb between about 30 and 90 percent by volume and usually at least about 45 percent by volume of the $CO_2$ adsorbed at the conditions described above when exposed to a vacuum of $10^{-4}$ atmosphere at 25° C.

The gels of the present invention are formed most advantageously by reacting an aqueous solution of the water soluble salts of one or more bivalent metals and one or more trivalent metals with a solution of ammonium carbonate or monovalent alkali metal carbonate capable of reacting with the metal salts to liberate $CO_2$.

Among the water soluble salts of the bivalent and trivalent metals may be mentioned the halides, nitrates, sulfates, and other water soluble salts of both strong and weak inorganic and organic acids which will react with carbonate ion containing solutions to liberate $CO_2$. Preferred for use are the chloride and nitrate salts of bivalent and trivalent metals.

The relative amounts of the bivalent metal salts and trivalent metal salts added to the carbonate solutions will depend upon the final composition of the gel that is desired. In other words, the ratio of bivalent metal to trivalent metal added to the ammonium carbonate or monovalent alkali metal carbonate aqueous solution in the form of a water soluble salt will depend on the molar ratio of bivalent metal to trivalent metal in the gel desired. As will be shown hereinafter, the nominal composition of the gels, calculated from the amounts of the metal salts added to the carbonate solution, sometimes differ from the actual composition of the gels as analyzed.

The reason for this discrepancy lies either in the solubility of the bivalent ion at the final pH of precipitation, or in the case of copper ferrite, for example, in the relatively great solubility of copper ferrite itself. The composition corresponding to the added reagents can usually be achieved at high pH of the final mixture, but performance of the resulting gel in adsorption will ordinarily suffer.

The state of the reaction during addition of the metal salt solution to the carbonate solution may be followed by pH measurement. As the acid salt solutions of the bivalent metals and the trivalent metals are added to the carbonate solution, the pH will fall from the figure for pure carbonate, which is between about 10.5 to 12.5. At pH of about 7.5 to 8.5, discontinuity in the pH measurement occurs, probably because of the start of carbon dioxide release. At the stoichiometric equivalent point, the pH is about 2.7 to 4.3. At this value, the bicarbonate ion can no longer exist. If this point is passed, the gel formed has been found to be useless. Accordingly, the amount of the solution of the metal salts added to the carbonate solution should be such that the pH of the solution does not fall below pH of about 2.7 to 4.3, and is preferably between pH 4.5 and 6.

In other words, the amount of the acid salts of the bivalent and trivalent metals added to the carbonate solution should be slightly less than or substantially equal to the stoichiometric amount required to react with the carbonate ions in solutions.

In preparing the new and novel adsorbents, the precipitation solutions are preferably maintained at as low a temperature as is consonant with proper carbon dioxide evolution, i.e., a temperature suitable to cause carbon dioxide evolution to occur and to progress to completion. With this in mind, the temperature of the precipitation solutions may vary from about 0° C. to room temperature, i.e., 30° to 35° C., or even higher. Ordinarily, however, the temperature of the precipitation solution should not be higher than about 20° C. or lower than about 10° C.

As indicated hereinabove, during the gel formation stage there is evolved carbon dioxide gas. Although not wanting to be limited to this explanation, it appears that the evolution of carbon dioxide during the gel forming period results in particularly efficient carbon dioxide adsorption after the gel has been dried.

The rate of addition of the metal salt solutions to the carbonate solution should be such as to prevent build up of local concentrations of unreacted metal salts in the carbonate solutions. It has been discovered that too rapid a rate of addition of the metal salt solutions produces inferior products.

The quantity of the carbonate ions may vary between about 0 and 10 percent or higher, and preferably between about 0 and 7 percent in excess of the stoichiometric quantity required to react with the quantity of metal salts added thereto.

The concentration of the metal salt and the carbonate precipitation solutions will depend on a number of factors. In general, the concentration of total metal salts in the metal salt solution used to carry out the precipitation may vary from about 0.1 to 4.0 moles per liter, and is preferably between about 0.25 and 2.0 moles per liter. The concentration of carbonate ions in the carbonate solution at the commencement of precipitation may vary from about 0.1 to 4.0 moles per liter, and is preferably between about 0.25 and 2.0 moles per liter.

Following precipitation, the gel may be filtered or otherwise separated from the mother liquor, washed with water to substantially remove impurities, and then dehydrated to constant weight. In drying to constant weight, care should be taken to prevent the gel from being subjected to high temperatures for prolonged periods of time. Preferably, the gel is dried at temperatures below about 110° C. under vacuum. If desired, the gel may be washed with a volatile solvent such as alcohol, acetone and the like prior to drying to aid in dehydration. Ordinarily, a single solvent wash will be sufficient for this purpose. If necessary, the gel may be swept with carbon dioxide following drying to remove chemisorbed water in the gel.

The method described herein, although particularly applicable to producing the cogels of a bivalent metal oxide or oxides and ferric oxide described hereinabove, may also be used to produce gels of the type described in copending application, Serial No. 41,801, filed July 11, 1960. Thus, using these methods, gels that successfully adsorb carbon dioxide have been prepared with the bivalent metals zinc, iron, nickel, copper, cobalt, manganese, magnesium, calcium, barium, and cadmium, or mixtures thereof, and the trivalent metals aluminum, iron, and chromium, or mixtures thereof. Although it is univalent, the properties of the compounds of lithium more nearly resemble those of a bivalent metal of the alkaline earth group than of the alkali metal group to which it formally belongs. This effect is fully explained in standard treatises of inorganic chemistry. As might be expected, lithium behaves as a bivalent metal in the gels described herein and forms an effective carbon dioxide adsorbing composition. These gels may be made integral; i.e., there may be a combination of metals coprecipitated as a single gel.

Where insufficient surface has been found to exist in the gel itself, the gels may be supported on asbestos, or other high surface support material. Pellets of the gels have been prepared and found useful for some purposes. The gels may be pelleted without binder before they are dried. A press mold lubricant, such as graphite, may also be incorporated in amounts up to 1 percent by weight with no loss of adsorptivity.

The following specific examples are given to demonstrate the various factors affecting the production of suitable gels for the purposes of the present invention and are set forth by way of explanation and not of limitation.

EXAMPLE 1

A cogel corresponding to the composition $CoO:Fe_2O_3$ having a nominal molar ratio of cobalt to ferric iron of 5:95 is prepared as follows:

A solution of 4.4 grams of cobalt nitrate hexahydrate and 115.1 grams of ferric nitrate nonahydrate in 400 ml. $H_2O$ at about 10° C. is prepared. A second solution of 61.2 grams of potassium carbonate in 400 ml. of water at about 10° C. is also prepared. The solution of metal nitrates is slowly run into the potassium carbonite solution from a burette at a rate of about 40 ml. per minute with constant stirring. The gel of $CoO:Fe_2O_3$ coprecipitates with the evolution of $CO_2$ gas. The cogel is filtered in a press and then washed with 400 ml. of $H_2O$ by slurrying the gel in the indicated amount of water. The gel is then filtered again. The water washing and filtration step is repeated. The filtrate is then washed with 600 ml. ethanol by slurrying the gel in the solvent and filtered. The cogel is then dried in a vacuum oven at 50° C. and 27 in. Hg pressure.

The rate of addition may be controlled by controlling the orifice size of the burette. Good results are achieved when the orifice is about 0.5 to 3 mm. in diameter and the burette is operated under a hydrostatic pressure of up to 30 inches of water. As indicated above, the rate of addition of the metal salt solution should be low enough to prevent build up of local concentration of unreacted metal salts in the carbonate solutions.

EXAMPLES 2 TO 4

Example 1 is repeated to prepare the cogels indicated in Table 1. The type of cogel and quantity of reagents employed will be clear from Table 1. Except for the reagents, the procedure is identical to Example 1.

Table 1

| Example | Metal Content | Molar Ratio Bivalent to Trivalent Metal (Nominal Composition) | Bivalent Nitrate Type | Amount, gm. | Ferric Nitrate Nonahydrate, gm. | Potassium Carbonate to Neutralize, gm. |
|---|---|---|---|---|---|---|
| 2 | CuO:Fe₂O₃ | 5:95 | (Trihydrate) | 3.6 | 115.1 | 61.2 |
|   |   | 2.5:97.5 | do | 1.75 | 117.1 | 61.7 |
|   |   | 0.75:99.25 | do | 0.54 | 120.3 | 62.1 |
| 3 | MnO:Fe₂O₃ | 5:95 | (50%-H₂O Soln.) | 5.4 | 115.1 | 61.2 |
|   |   | 1:99 | (50%-H₂O Soln.) | 1.07 | 120 | 61.9 |
| 4 | NiO:Fe₂O₃ | 5:95 | (Hexahydrate) | 4.4 | 115.1 | 61.2 |
|   |   | 1:99 | do | 0.87 | 120 | 61.9 |

Metal nitrates are dissolved in 400 ml. H₂O. Potassium carbonate in same amount H₂O. Wash precipitate after filtration 2 times with 400 ml. H₂O each time, then with 600 ml. ethanol. Precipiate slurried with wash liquid each time.

The cogels in Examples 1 to 4, inclusive, were tested to determine their ability to absorb and desorb $CO_2$.

Absorption studies were done by exposing the gels to the following environments at 1 atmosphere pressure for known periods of time: (1) pure $CO_2$ and (2) air containing 0.5 percent by volume $CO_2$. Two temperatures of absorption were used, namely 0° and 25° C. Weighing the gels before and after absorption gave the amount of $CO_2$ absorbed, and knowing the time of absorption gave the rate of absorption. From this latter figure was calculated the specific surface, S, of the gel in m.²/gram in a well known manner. The figure S is a measure of the ability of the gel to absorb $CO_2$, and is well known to the art.

The desorption characteristics of the gel produced in Examples 1 to 4, inclusive, were studied by drawing a vacuum of $10^{-4}$ atm. on the gel at 25° C. for a period of time corresponding to the period of time during adsorption. The ability of the gel to desorb $CO_2$ under these conditions is reported as RS in Table 2. RS is the reversible surface of the gel in m.²/gram and represents the portion of "S" desorbed under the indicated condition.

Table 2 gives the results of the adsorption and desorption tests run on the gels of Examples 1 to 4.

for ability to adsorb and desorb $CO_2$. The results of this work are reported in Table 3.

Table 3.—Ternary gels

| Metal Content | Molar Ratio of Metals (Nominal) | Desorption Temp. 25° C., Adsorption Temperature— | | | |
|---|---|---|---|---|---|
|   |   | 0° C. | | 25° C. | |
|   |   | S | RS | S | RS |
| CoO:CuO:Fe₂O₃ | 1/1/98 | ------ | ------ | 65 | 55 |
| CoO:MnO:Fe₂O₃ | 1/1/98 | 130 | 110 | 95 | 72 |
| CoO:NiO:Fe₂O₃ | 1/1/98 | 115 | 105 | 85 | 70 |
| CuO:NiO:Fe₂O₃ | 1/1/98 | 120 | 110 | 80 | 70 |
| CoO:CuO:Fe₂O₃ | 5/5/90 | 200 | 110 | 150 | 70 |
| CoO:MnO:Fe₂O₃ | 5/5/90 | 200 | 150 | 140 | 90 |
| CoO:NiO:Fe₂O₃ | 5/5/90 | 175 | 135 | 115 | 80 |

S=Specific surface, m.²/gm. Absorption time of 20 minutes.
RS=Reversible surface, m.²/gm. Desorption time of 20 minutes.

The general results following from these embodiments indicate, as a general rule, that in the gels prepared with such compounds and under such process conditions, the greater the amount of carbon dioxide evolved during the

Table 2

| Example | Metal Content | Molar Ratio Bivalent to Trivalent Metal (Nominal Composition) | Molar Ratio Bivalent to Trivalent Metal (Analyzed Composition) | Desorption Temp. 25° C., Adsorption Temp.— | | | | |
|---|---|---|---|---|---|---|---|---|
|   |   |   |   | 0° | | 25° | | |
|   |   |   |   | S | RS | S | RS | S (0.5% CO₂ in air) |
| 1 | CoO:Fe₂O₃ | 5:95 | 0.6:99.4 | 325 | 150 | 250 | 75 | 212 |
| 2 | CuO:Fe₂O₃ | 5:95 | 4.6:95.4 | 260 | 110 | 180 | 60 | 80 |
|   |   | 2.5:97.5 | 2.4:97.6 | 160 | 115 | 105 | 55 | 67 |
|   |   | 0.75:99.25 | 0.5:99.5 | 185 | 140 | 100 | 60 | 65 |
| 3 | MnO:Fe₂O₃ | 1:99 | 0.03:99.97 | 165 | 145 | 90 | 70 | ------ |
| 4 | NiO:Fe₂O₃ | 5:95 | 2.5:97.5 | 225 | 120 | 170 | 62 | 95 |
|   |   | 1:99 | 0.4:99.6 | 135 | 110 | 95 | 70 | 50 |

S=Specific surface, m²/gm. for 100% CO₂ unless otherwise specified. Absorption time of 20 minutes.
RS=Reversible surface, m.²/gm. (portion of S desorbed at 25° C., 10⁻⁴ atm.). Desorption time 20 minutes.

EXAMPLE 5

Using the procedure of Example 1, ternary compositions of the transitional ferrites were prepared and tested gel forming stage, the more efficient are the gels as carbon dioxide adsorbents.

It has further been noted that the gel bodies do not lose their ability to adsorb carbon dioxide although they pick up a considerable portion of their weight in water. It has been found, to the contrary, that gel bodies prepared in the manner of the present invention are in fact more efficient carbon dioxide adsorbents when they contain water than when they are dry. This is particularly desirable where they are used to remove carbon dioxide from air which is breathed by animals, since in addition to carbon dioxide, water is also produced as a result of metabolism.

The gels disclosed herein function in spite of the presence of water vapor in the atmosphere, and when exposed to an atmosphere of $CO_2$ and water vapor, absorb $CO_2$ and water vapor, and when desorbed, desorb both of these materials.

Table 4 shows the results of tests to determine the ability of a cogel corresponding to the composition $CoO:Fe_2O_3$ having an analyzed molar ratio of cobalt to ferric iron of 0.2:99.8 to function in the presence of moist carbon dioxide containing atmospheres.

*Table 4*

|  | Dry Pure $CO_2$ | Adsorption of Wet $CO_2$ by $CoO:Fe_2O_3$ | | |
|---|---|---|---|---|
|  |  | Dry $CO_2$, 0.56% by volume in air | 100% $CO_2$ Saturated with $H_2O$ vapor | Air+0.28% by volume $CO_2$, +0.28% by volume $H_2O$ |
| S, 25° C | 180 | 130 | 160 | 140 |
| RS, 25° C | 60 | 15 | 55 | 20 |

As indicated above, the gels of the present invention have the ability to absorb and desorb cyclically.

To show this ability a gel having a composition of $CoO:Fe_2O_3$ with an analyzed molar ratio of cobalt to ferric iron of 0.6:99.4 was subjected to absorption and desorption for 100 cycles. The results of this test are indicated in Table 5.

*Table 5.—Performance of gels with cycling*

| Gel | No. Cycles | Desorption Temp. 25° C., Adsorption Temp.— | | | |
|---|---|---|---|---|---|
|  |  | 25° | | 0° | |
|  |  | S | RS | S | RS |
| $CoO:Fe_2O_3(0.6:99.4)$ | 10 | 140 | 80 | 200 | 140 |
|  | 50 | 200 | 60 | | |
|  | 100 | 260 | 80 | 300 | 120 |

The optimum gel for the present purpose of treating confined atmospheres to remove $CO_2$ is one which not only takes up large amounts of that gas but which may be readily regenerated in order that it may be used again and again. As can be seen from Table 4, the gels described herein have this ability.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. A regenerable adsorbent for carbon dioxide gas which comprises the oxide of a first metal selected from the group consisting of lithium, zinc, bivalent iron, nickel, copper, cobalt, manganese, magnesium, calcium, barium, cadmium, and mixtures of the foregoing, in combination with an oxide of a trivalent metal selected from the group consisting of iron, aluminum and chromium, the molar ratio of said first metal to said trivalent metal being in the range of 0.25 to 5 to 99.75 to 95, said adsorbent having a specific surface for adsorption of pure carbon dioxide at 1 atmosphere pressure and 0° C. of at least about 100 m.²/gm. and being capable of desorbing at least about 30 percent by volume of the carbon dioxide adsorbed at 0° C. and 1 atmosphere pressure when exposed to a vacuum of $10^{-4}$ atmosphere at 25° C.

2. A regenerable adsorbent as set forth in claim 1 wherein it is supported on a support.

3. A regenerable adsorbent for carbon dioxide gas corresponding to the formula $CoO:Fe_2O_3$ in which the molar ratio of cobalt to ferric iron is in the range of from 0.25 to 5.0 to 99.75 to 95.0, said adsorbent having a specific surface for adsorption of pure carbon dioxide at 1 atmosphere pressure and 0° C. of at least about 100 m.²/gm., and being capable of desorbing at least about 30 percent by volume of the carbon dioxide adsorbed at 0° C. and 1 atmosphere pressure when exposed to a vacuum of $10^{-4}$ atmosphere at 25° C.

4. A method for preparing a regenerable carbon dioxide adsorbent which comprises establishing an aqueous solution comprising between about 0.1 and 4.0 moles per liter of a solution comprising a carbonate of a member selected from the group consisting of alkali metal and ammonium, adding thereto at least one salt of a first metal selected from the group consisting of lithium, zinc, bivalent iron, nickel, copper, cobalt, manganese, magnesium, calcium, barium, cadmium, including mixtures of the foregoing, and one salt of a trivalent metal selected from the group consisting of aluminum, iron and chromium, including mixtures of the foregoing, continuing addition of said salts until there has been added an amount of salt which is 0 to 10 percent less than the amount stoichiometrically required to react with the carbonate ions in the solution, maintaining the temperature of the solution between about 0° and 35° C., but high enough to sustain evolution of carbon dioxide, separating the gel from the resulting solution and dehydrating the gel at temperatures less than 110° C.

5. A process as set forth in claim 4 wherein the gel is dehydrated at a temperature in the range of from 50° to 110° C. under vacuum.

6. A process as set forth in claim 4 wherein the gel is washed with a volatile solvent prior to dehydration.

7. A process as set forth in claim 4 wherein the salts of said first and said trivalent metals are added to the carbonate solution at a rate low enough to prevent build up of local concentration of unreacted metal salts in the carbonate solution.

8. The process of claim 4 wherein the pH of the carbonate solution is initially between about 10.5 and 12.5 and, upon completion of addition of the salts of said first and said trivalent metals, is between about 4.5 and 6.

9. The process of claim 4 wherein the temperature of the solution is maintained between about 10° and 20° C. during addition of the salts of said first and said trivalent metals.

10. A method for preparing a regenerable carbon dioxide adsorbent which comprises establishing an aqueous solution comprising between about 0.1 and 4.0 moles per liter of a solution comprising a carbonate of a member selected from the group consisting of alkali metal and ammonium, adding thereto a salt of bivalent cobalt, and a salt of trivalent iron, continuing addition of said salts until there has been added an amount of salt which is 0 to 10 percent less than the amount stoichiometrically required to react with the carbonate ions in the solution, maintaining the temperature of the solution between about 10° to 20° C. but high enough to sustain evolution of carbon dioxide, separating the gel from the resulting solution and dehydrating the gel at temperatures less than 110° C.

(References on following page)

References Cited by the Examiner

UNITED STATES PATENTS

| | | | |
|---|---|---|---|
| 1,345,323 | 6/1920 | Frazer | 252—474 X |
| 1,520,305 | 12/1924 | Patrick | 252—474 |
| 1,801,382 | 4/1931 | Wietzel et al. | 252—474 |
| 1,860,298 | 5/1932 | Stelzner | 23—4 |
| 1,922,187 | 8/1933 | Zisch | 23—4 |
| 1,976,875 | 10/1934 | Connolly et al. | 252—471 X |
| 2,389,309 | 11/1945 | Herzmark | 23—4 |
| 2,437,706 | 3/1948 | Paterson | 252—474 X |
| 2,457,719 | 12/1948 | Pine et al. | 252—474 X |
| 2,470,786 | 5/1949 | Mosesman | 252—474 |
| 2,567,297 | 9/1951 | Milligan et al. | 252—474 |
| 2,729,664 | 1/1956 | Kirshenbaum | 252—474 X |
| 3,141,729 | 7/1964 | Clarke et al. | 23—4 |

OSCAR R. VERTIZ, *Primary Examiner.*

JULIUS GREENWALD, MAURICE A. BRINDISI,
*Examiners.*

R. D. LOVERING, G. T. OZAKI, *Assistant Examiners.*